US009167020B2

(12) United States Patent
Abdo et al.

(10) Patent No.: US 9,167,020 B2
(45) Date of Patent: Oct. 20, 2015

(54) WEB-BROWSER BASED DESKTOP AND APPLICATION REMOTING SOLUTION

(75) Inventors: Nadim Y. Abdo, Redmond, WA (US); B. Anil Kumar, Saratoga, CA (US); Wilhelm R. Schmieder, Snoqualmie, WA (US); Sridhar Sankuratri, Campbell, CA (US); Krishna Mohan Malladi, San Jose, CA (US); Asael Dror, San Francisco, CA (US); Joy Chik, Redmond, WA (US); Nelamangal Krishnaswamy Srinivas, Sammamish, WA (US); Tad Brockway, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 144 days.

(21) Appl. No.: 13/158,268

(22) Filed: Jun. 10, 2011

(65) Prior Publication Data

US 2012/0317236 A1    Dec. 13, 2012

(51) Int. Cl.
  *G06F 15/16* (2006.01)
  *H04L 29/08* (2006.01)
  *H04L 29/06* (2006.01)
  *G06F 9/44* (2006.01)

(52) U.S. Cl.
  CPC .............. *H04L 67/02* (2013.01); *G06F 9/4445* (2013.01); *H04L 67/08* (2013.01); *H04L 67/42* (2013.01)

(58) Field of Classification Search
  USPC ................................................. 709/203–206
  See application file for complete search history.

(56) References Cited

U.S. PATENT DOCUMENTS

| 7,035,899 | B2* | 4/2006 | Marchon et al. ............... 709/204 |
| 7,694,324 | B2 | 4/2010 | McDowell et al. |
| 8,595,371 | B2 | 11/2013 | Messer |
| 2006/0069797 | A1 | 3/2006 | Abdo et al. |
| 2007/0220161 | A1 | 9/2007 | Richey et al. |
| 2008/0016209 | A1* | 1/2008 | VanHarlingen et al. ...... 709/224 |
| 2008/0162635 | A1* | 7/2008 | Keren ............................ 709/204 |

(Continued)

FOREIGN PATENT DOCUMENTS

WO     2008137432 A3    11/2008

OTHER PUBLICATIONS

Merriam-Webster Dictionary, Definition of "decode," published Feb. 20, 2010.*
"Browser-Based Remote Support", Techinline Remote Desktop, http://www.techinline.com/, accessed Mar. 16, 2011, 1 page.

(Continued)

*Primary Examiner* — Joshua Joo
(74) *Attorney, Agent, or Firm* — Kate Drakos; Henry Gabryjelski; Micky Minhas

(57) ABSTRACT

An invention is disclosed for conducting a remote presentation session with a client that uses a web browser to conduct the session. In embodiments, a proxy server exists between the remote presentation server and the client. The proxy server establishes a HTTP session with the client and a remote presentation session with the client. The server generates graphics encoded with a remote presentation protocol and sends them to the proxy, which re-encodes them as video and sends them to the client for display in the web browser. The client captures user input at the web browser and sends it to the proxy, which encodes it with the remote presentation protocol and sends it to the server to be processed.

19 Claims, 13 Drawing Sheets

(56) References Cited

U.S. PATENT DOCUMENTS

| | | | |
|---|---|---|---|
| 2008/0168355 A1 | 7/2008 | Dunlap et al. | |
| 2008/0270612 A1 | 10/2008 | Malakapalli et al. | |
| 2008/0313545 A1 | 12/2008 | Patel et al. | |
| 2009/0122011 A1* | 5/2009 | Timokhin et al. | 345/163 |
| 2009/0327917 A1* | 12/2009 | Aaron et al. | 715/751 |
| 2010/0031233 A1 | 2/2010 | Li et al. | |
| 2010/0111410 A1* | 5/2010 | Lu et al. | 382/166 |
| 2010/0131868 A1* | 5/2010 | Chawla et al. | 715/759 |
| 2010/0169951 A1 | 7/2010 | Vaughan et al. | |
| 2010/0257456 A1* | 10/2010 | Lieb et al. | 715/741 |
| 2010/0306403 A1* | 12/2010 | Tan et al. | 709/231 |
| 2010/0306406 A1 | 12/2010 | Mathur et al. | |
| 2011/0173256 A1* | 7/2011 | Khalatian | 709/203 |
| 2011/0276619 A1* | 11/2011 | Khan et al. | 709/203 |
| 2012/0005301 A1* | 1/2012 | Braghis et al. | 709/213 |
| 2012/0143983 A1* | 6/2012 | Kipnis et al. | 709/217 |
| 2012/0177030 A1* | 7/2012 | Rose et al. | 370/352 |

OTHER PUBLICATIONS

"Single-Click Remote Desktop Forwarding", Remote Desktop and SSH Tunneling (Bitvise), http://www.bitvise.com/remote-desktop, accessed Mar. 16, 2011, 2 pages.

"Thin Client Architecture", Windows CE 5.0, http://msdn.microsoft.com/en-us/library/ms927506(d=printer).aspx, accessed Mar. 16, 2011, 6 pages.

Northrup, "Set Up Remote Desktop Web Connection with Windows XP", Windows XP Expert Zone Community Columnist, Jul. 28, 2003, 3 pages.

Perez, "Google's New OS Will Offer Remote Desktop Capabilities", Read Write Web, Jun. 11, 2010, 2 pages.

Usman, "ThinVNC: Windows Remote Desktop via HTML5 Web Browser", Aug. 7, 2010, 7 pages.

Kim et al.; "pTHINC: A Thin-Client Architecture for Mobile Wireless Web"; ACM $15^{th}$ Int'l Conference; May 2006; p. 143-152.

* cited by examiner

WEB-BROWSER BASED DESKTOP AND APPLICATION REMOTING SOLUTION

BACKGROUND

In a remote presentation session, a client computer and a server computer communicate across a communications network. The client sends the server locally-received input, such as mouse cursor movements and keyboard presses. In turn, the server receives this input and performs processing associated with it, such as executing an application in a user session. When the server performs processing that results in output, such as graphical output or sound, the server sends this output to the client for presentation. In this manner, applications appear to a user of the client to execute locally on the client when, they in fact, execute on the server.

A problem with conventional remote presentation sessions is that the client participating in the remote presentation session needs to have installed upon it a remote presentation session application—an application that is configured to communicate with the server in accordance with the remote presentation session protocol. This requirement means that there may be many computers accessible to a user that have a network connection that may communicate with the remote presentation session server, but lack the remote presentation session application with which to conduct a remote presentation session.

There are also techniques for a client to conduct a remote presentation session with a web browser, rather than a remote-presentation-session-specific application. In these techniques, commonly the remoted desktop image is subdivided into a plurality of tiles, and each of these image tiles are sent to the client (or an indication of the tile, where the client has cached the tile), and displayed in the client's web browser. When the remoted desktop image changes, the "dirty" tiles are determined—those tiles where the image has changed—and those dirty tiles are sent to the client for display via the web browser.

There are many problems with these techniques for a client conducting a remote presentation session using a web browser, some of which are well known.

SUMMARY

One problem with a client conducting a remote presentation session using a web browser where the client displays image tiles is a problem of performance. Compared to a remote presentation session using a specific remote presentation session application, the web browser-and-image-tiles techniques offer a much lower frame rate. Not only is the frame rate much lower, but frequently the frame rate is so low that it negatively impacts user experience. That is, the frame rate is often so low that motions displayed in the remote presentation session are jerky, and there is a disconnect between the input the user provides and when the user sees the graphical result of processing that input.

It would therefore be an improvement to provide an invention for a client lacking a remote presentation session application to conduct a remote presentation session with a server using video rather than image tiles. In embodiments of the invention, a client has a web browser application that is configured to both display video and receive user input that is directed to the web browser application. The client uses the web browser to establish an Ajax (Asynchronous JavaScript and XML—Extensible Markup Language) connection with the server to open a connection. The client and server then exchange information to authenticate the client to the server. The client then captures user input (e.g. mouse, keyboard, or touch) directed to the web browser window and asynchronously sends it to the server formatted, for instance, as XML or JSON, and the server receives this input and injects it into the appropriate application or user session. As an application or user session generates graphical output, the server captures this graphical output, encodes it to video, and sends it to the client for display via the web browser.

DETAILED DESCRIPTION OF ILLUSTRATIVE EMBODIMENTS

Figure 1:
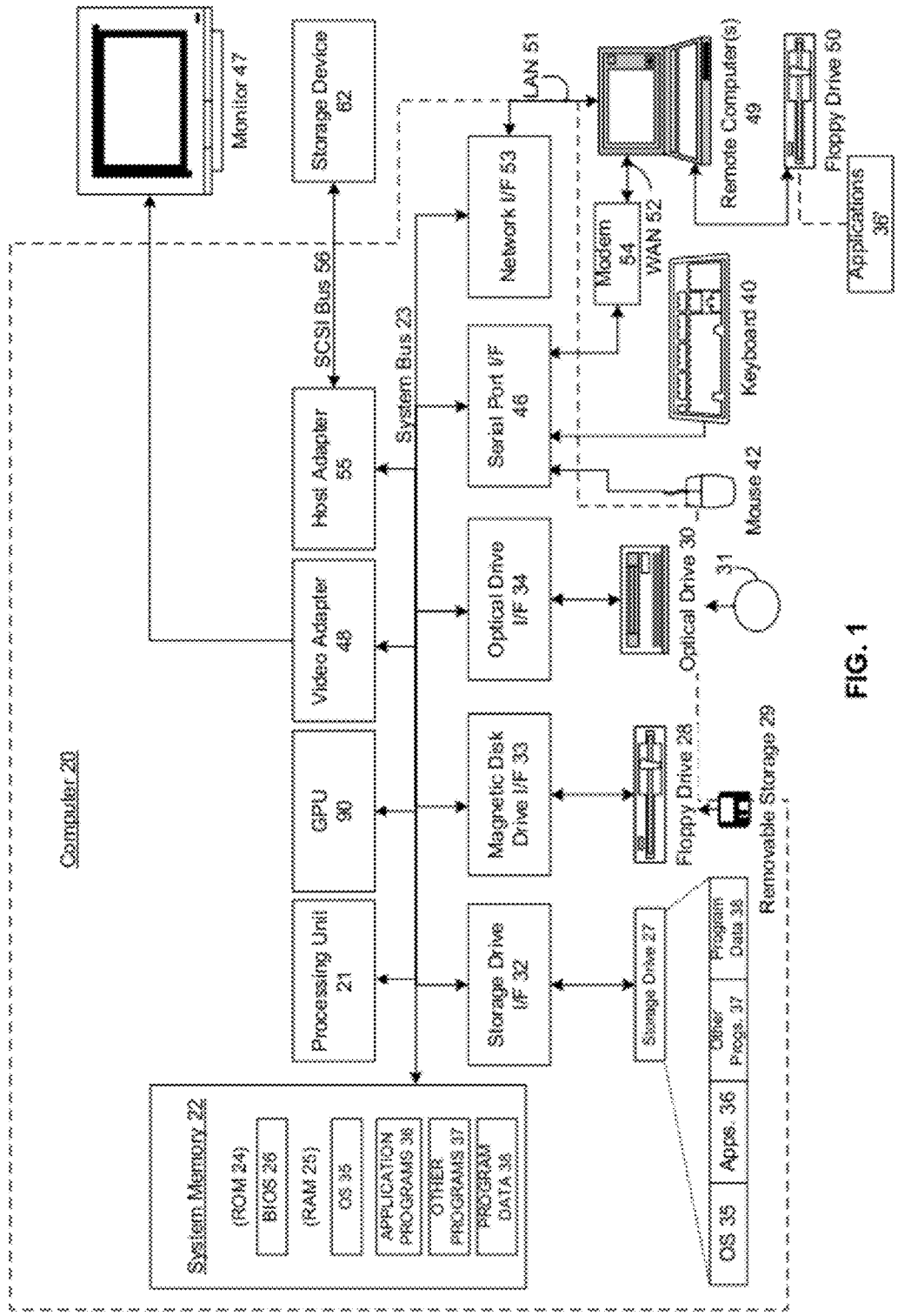
FIG. 1 depicts an example general purpose computing environment in which embodiments of the invention may be implemented.

Embodiments of the invention may execute on one or more computer systems. FIG. 1 and the following discussion are intended to provide a brief general description of a suitable computing environment in which embodiments of the invention may be implemented.

FIG. 1 depicts an example general purpose computing system. The general purpose computing system may include a conventional computer 20 or the like, including processing unit 21. Processing unit 21 may comprise one or more processors, each of which may have one or more processing cores. A multi-core processor, as processors that have more than one processing core are frequently called, comprises multiple processors contained within a single chip package.

Computer 20 may also comprise graphics processing unit (GPU) 90. GPU 90 is a specialized microprocessor optimized to manipulate computer graphics. Processing unit 21 may offload work to GPU 90. GPU 90 may have its own graphics memory, and/or may have access to a portion of system memory 22. As with processing unit 21, GPU 90 may comprise one or more processing units, each having one or more cores.

Computer 20 may also comprise a system memory 22, and a system bus 23 that communicative couples various system components including the system memory 22 to the processing unit 21 when the system is in an operational state. The system memory 22 can include read only memory (ROM) 24 and random access memory (RAM) 25. A basic input/output system 26 (BIOS), containing the basic routines that help to transfer information between elements within the computer 20, such as during start up, is stored in ROM 24. The system bus 23 may be any of several types of bus structures including a memory bus or memory controller, a peripheral bus, or a local bus, which implements any of a variety of bus architectures. Coupled to system bus 23 may be a direct memory access (DMA) controller 80 that is configured to read from and/or write to memory independently of processing unit 21. Additionally, devices connected to system bus 23, such as storage drive I/F 32 or magnetic disk drive I/F 33 may be configured to also read from and/or write to memory independently of processing unit 21, without the use of DMA controller 80.

The computer 20 may further include a storage drive 27 for reading from and writing to a hard disk (not shown) or a solid-state disk (SSD) (not shown), a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are shown as connected to the system bus 23 by a hard disk drive interface 32, a magnetic disk drive interface 33, and an optical drive interface 34, respectively. The drives and their associated computer-readable storage media provide non-volatile storage of computer readable instructions, data structures, program modules and other data for the computer 20.

Although the example environment described herein employs a hard disk, a removable magnetic disk 29 and a removable optical disk 31, it should be appreciated by those skilled in the art that other types of computer readable media which can store data that is accessible by a computer, such as flash memory cards, digital video discs or digital versatile discs (DVDs), random access memories (RAMs), read only memories (ROMs) and the like may also be used in the example operating environment. Generally, such computer readable storage media can be used in some embodiments to store processor executable instructions embodying aspects of the present disclosure. Computer 20 may also comprise a host adapter 55 that connects to a storage device 62 via a small computer system interface (SCSI) bus 56.

A number of program modules comprising computer-readable instructions may be stored on computer-readable media such as the hard disk, magnetic disk 29, optical disk 31, ROM 24 or RAM 25, including an operating system 35, one or more application programs 36, other program modules 37, and program data 38. Upon execution by the processing unit, the computer-readable instructions cause actions described in more detail below to be carried out or cause the various program modules to be instantiated. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the INTERNET. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In an embodiment where computer 20 is configured to operate in a networked environment, OS 35 is stored remotely on a network, and computer 20 may netboot this remotely-stored OS rather than booting from a locally-stored OS. In an embodiment, computer 20 comprises a thin client where OS 35 is less than a full OS, but rather a kernel that is configured to handle networking and display output, such as on monitor 47.

Figure 2:
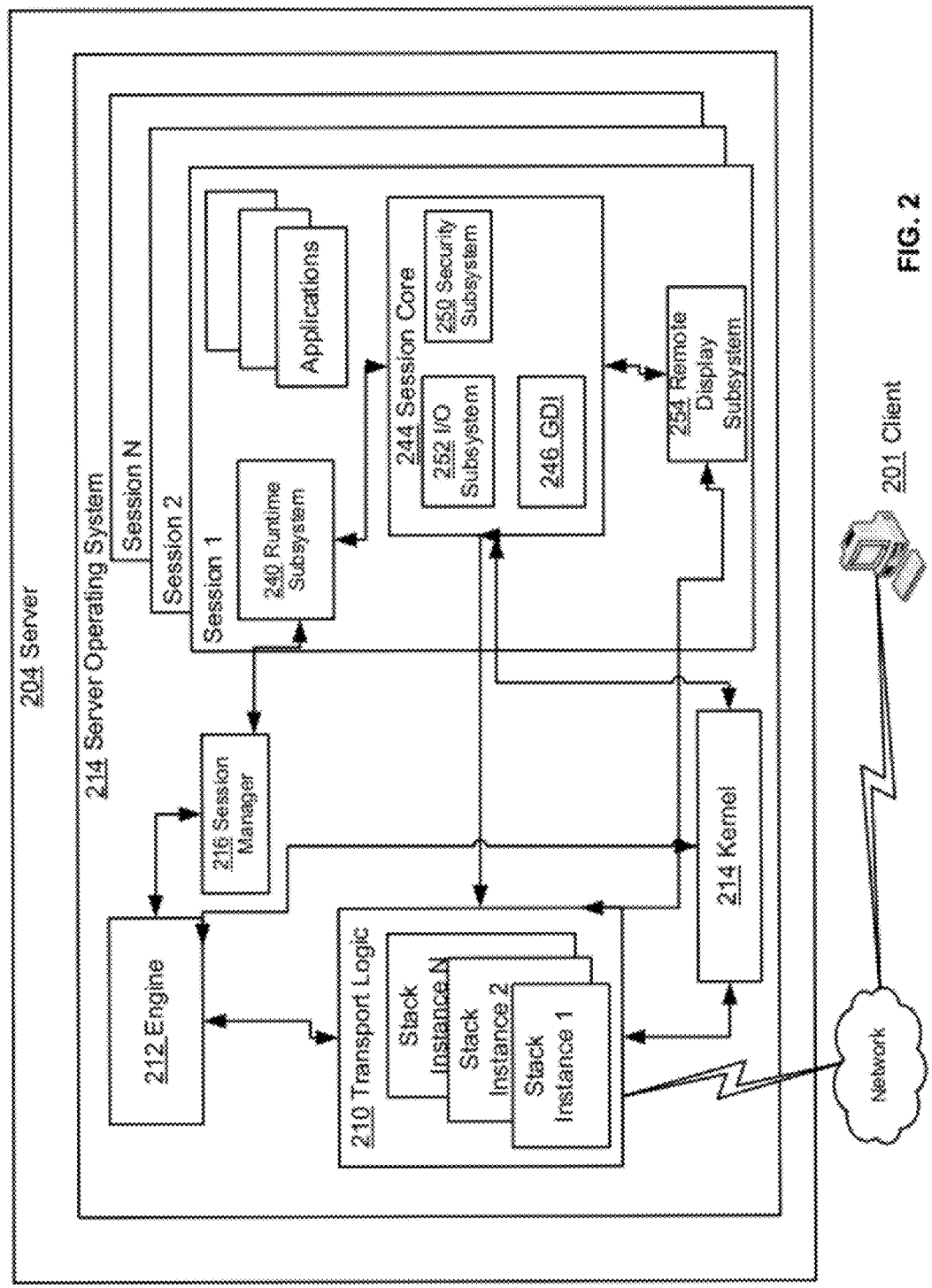
FIG. 2 depicts an example remote presentation session server in which embodiments of the invention may be implemented.

FIG. 2 generally illustrates an example environment wherein aspects of the present invention can be implemented. For instance, the server 204 may implement the operational procedures of FIG. 8. One skilled in the art can appreciate that the example elements depicted by FIG. 2 are illustrated to provide an operational framework for describing the present invention. Accordingly, in some embodiments the physical layout of each environment may be different depending on different implementation schemes. Thus the example operational framework is to be treated as illustrative only and in no way limit the scope of the claims.

Depicted in FIG. 2 is server 204, which may include circuitry configured to effectuate a remote presentation session server, or in other embodiments the server 204 can include circuitry configured to support remote desktop connections. In the depicted example, the server 204 can be configured to generate one or more sessions for connecting clients such as sessions 1 through N (where N is an integer greater than 2). Briefly, a session in example embodiments of the present invention can generally include an operational environment that is effectuated by a plurality of subsystems, e.g., software code, that are configured to interact with a kernel 214 of server 204. For example, a session can include a process that instantiates a user interface such as a desktop window, the subsystems that track mouse movement within the window, the subsystems that translate a mouse click on an icon into commands that effectuate an instance of a program, etc. A session can be generated by the server 204 on a user by user basis by the server 204 when, for example, the server 204 receives a connection request over a network connection from a client 201. Generally, a connection request can first be handled by the transport logic 210 that can, for example, be effectuated by circuitry of the server 204. The transport logic 210 can in some embodiments include a network adaptor; firmware, and software that can be configured to receive connection messages and forward them to the engine 212. As illustrated by FIG. 2, the transport logic 210 can in some embodiments include protocol stack instances for each session. Generally, each protocol stack instance can be configured to route user interface output to a client and route user input received from the client to the session core 244 associated with its session.

Continuing with the general description of FIG. 2, the engine 212 in some example embodiments of the present invention can be configured to process requests for sessions; determine the functionality for each session; generate sessions by allocating a set of physical resources for the session; and instantiating a protocol stack instance for the session. In some embodiments the engine 212 can be effectuated by specialized circuitry components that can implement some of the above mentioned operational procedures. For example, the circuitry in some example embodiments can include memory and a processor that is configured to execute code that effectuates the engine 212. As depicted by FIG. 2, in some instances the engine 212 can receive connection requests and determine that, for example, a license is available and a session can be generated for the request. In the situation where the server 204 is a remote computer that includes remote desktop capabilities, the engine 212 can be configured to generate a session in response to a connection request without checking for a license. As illustrated by FIG. 2, a session manager 216 can be configured to receive a message from an engine 212 and in response to the message the session manager 216 can add a session identifier to a table; assign memory to the session identifier; and generate system environment variables and instances of subsystem processes in memory assigned to the session identifier.

As illustrated by FIG. 2, the session manager 216 can instantiate environment subsystems such as a runtime subsystem 240 that can include a kernel mode part such as the session core 244. For example, the environment subsystems in an embodiment are configured to expose some subset of services to application programs and provide an access point to the kernel of the operating system 214. In example embodiments the runtime subsystem 240 can control the execution of processes and threads and the session core 244 can send requests to the executive of the kernel 214 to allocate memory for the threads and schedule time for them to be executed. In an embodiment the session core 244 can include a graphics display interface 246 (GDI), a security subsystem 250, and an input subsystem 252. The input subsystem 252 can in these embodiments be configured to receive user input from a client 201 via the protocol stack instance associated with the session and transmit the input to the session core 244 for the appropriate session. The user input can in some embodiments include signals indicative of absolute and/or relative mouse movement commands, mouse coordinates, mouse clicks, keyboard signals, joystick movement signals, etc. User input, for example, a mouse double-click on an icon, can be received by the session core 244 and the input subsystem 252 can be configured to determine that an icon is located at the coordinates associated with the double-click. The input subsystem 252 can then be configured to send a notification to the runtime subsystem 240 that can execute a process for the application associated with the icon.

In addition to receiving input from a client 201, draw commands can be received from applications and/or a desktop and be processed by the GDI 246. The GDI 246 in general can include a process that can generate graphical object draw commands. The GDI 246 in this example embodiment can be configured to pass its output to the remote display subsystem 254 where the commands are formatted for the display driver that is attached to the session. In certain example embodiments one or more physical displays can be attached to the server 204, e.g., in a remote desktop situation. In these example embodiments the remote display subsystem 254 can be configured to mirror the draw commands that are rendered by the display driver(s) of the remote computer system and transmit the mirrored information to the client 201 via a stack instance associated with the session. In another example embodiment, where the server 204 is a remote presentation session server, the remote display subsystem 254 can be configured to include virtual display driver(s) that may not be associated with displays physically attacked to the server 204, e.g., the server 204 could be running headless. The remote display subsystem 254 in this embodiment can be configured to receive draw commands for one or more virtual displays and transmit them to the client 201 via a stack instance associated with the session. In an embodiment of the present invention, the remote display subsystem 254 can be configured to determine the display resolution for each display driver, e.g., determine the display resolution of the virtual display driver(s) associated with virtual displays or the display resolution of the display drivers associated with physical displays; and route the packets to the client 201 via the associated protocol stack instance.

In some example embodiments the session manager 216 can additionally instantiate an instance of a logon process associated with the session identifier of the session that can be configured to handle logon and logoff for the session. In these example embodiments drawing commands indicative of the graphical user interface associated with the logon process can be transmitted to the client 201 where a user of the client 201 can input an account identifier, e.g., a username/password combination, a smart card identifier, and/or biometric information into a logon screen. The information can be transmitted to server 204 and routed to the engine 212 and the security subsystem 250 of the session core 244. For example, in certain example embodiments the engine 212 can be configured to determine whether the user account is associated with a license; and the security subsystem 250 can be configured to generate a security token for the session.

Figure 3:
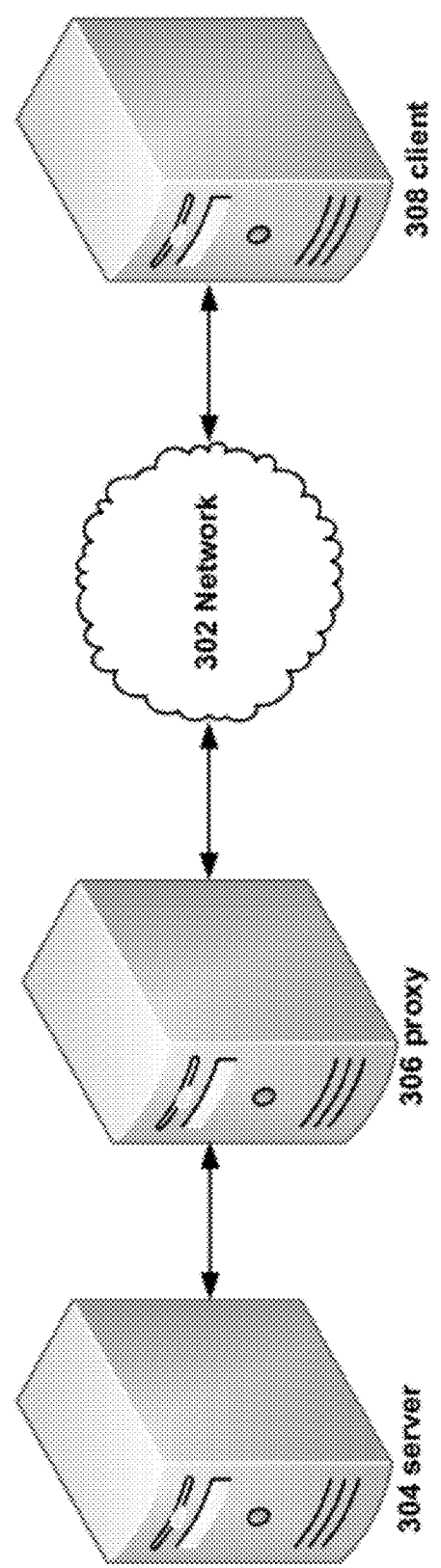
FIG. 3 depicts a client conducting a remote presentation session with a web browser, where, a proxy converts remote presentation session data into video.

FIG. 3 depicts a client conducting a remote presentation session with a web browser, where a proxy converts remote presentation session data into video. In embodiments, server 304 may be implemented in server 204 of FIG. 2, and proxy 306 and client 308 may be implemented in computer 20 of FIG. 1. In embodiments, server 304 is conducting a remote presentation session by receiving and sending remote presentation protocol-encoded data, and client 308 is conducting a remote presentation session by receiving and sending HTTP-encoded data (including video). Proxy 306 receives remote-presentation-protocol-encoded data (e.g. graphical output) from server 304, encodes it as video, and sends it to client 308 as HTTP-encoded data. Likewise, proxy 306 receives HTTP-encoded data (e.g. user input) from client 308, encodes it as remote-presentation-protocol-encoded data, and sends it to server 304.

Client 308 may initiate a remote presentation session by establishing an HTTP connection with proxy 306. The HTTP connection may be a variation of HTTP, such as a HTTPS (HTTP Secure) connection. This establishing an HTTP connection may be effectuated such as by a user of client 308 providing user input for a web browser of client 308 to open a web page associated with establishing a HTTP connection with proxy 306. The HTTP connection may be an Ajax connection between client 308 and proxy 306.

The HTTP connection being established, client 308 may authenticate itself to proxy 306 (which, in turn, may use a credential associated with the authentication to authenticate to server 304). This authentication may, for instance, comprise the client sending a user identification and password to proxy 306, which proxy 306 may authenticate against a database of user-password pairs. In embodiments, proxy 306 does not authenticate the client itself, but, rather, uses a credential from client 308 to authenticate itself in establishing a remote presentation session with server 304. Where proxy 306 is successful in establishing a remote presentation session with server 304, it may determine that client 308 is authenticated to proxy 306.

Proxy 306 also establishes a remote presentation session with server 304 that is associated with client 308 (if proxy 306 has not done so already). In this remote presentation session, proxy 306 serves as the remote presentation session client (such as client 201 of FIG. 2), and server 304 servers as the remote presentation session server (such as server 204 of FIG. 2). In embodiments, when server 304 establishes a remote presentation session with proxy 306, server 304 uses an indication of a login associated with the session to determine a session or application to remote in the remote presentation session. For example, there may be a disconnected session associated with the login that the server 304 reconnects, or no session at all (in which case server 304 may instantiate a new session for the login). Where the session output of an application is remoted rather than the graphical output of a session (which may include one or more applications), the same process may occur—reconnecting a disconnected application, or initiating an application where there is no disconnected application.

Server 304 may then transmit the graphical output of what is being remoted to proxy 306 via the remote presentation session. This may be performed in a manner similar to how server 204 of FIG. 2 remotes graphical output to client 201. Proxy 306 receives this remote presentation protocol-encoded graphical data, and converts it to video to be sent to client 308 via the HTTP connection. In embodiments, proxy 306 decodes the remote presentation protocol-encoded graphical data to produce the graphical data, then encodes the graphical data as one or more frames of video. This video may be encoded in a format that the client may natively decode. For example, the client's web browser may be configured to process data in HTML5 format, including natively decoding one or more video formats referenced by a HTML5<video> tag. An example of such a format is H.264. Having encoded the graphical data in a video format, proxy 306 transmits the video to client 308, where client 308 decodes the video and displays it in a web browser.

Client 308 may issue commands that affect what server 304 processes. A user of client 308 may provide input directed to the web browser of client 308. This input may comprise input such as mouse, keyboard, and touch input, along with an indication of where the input was made relative to the video (e.g. 50 pixels to the right and 50 pixels below the upper left corner of the displayed video). Client 308 may capture this input at the web browser using JavaScript techniques for detecting input. Client 308 may then send the input to proxy 306. Client 308 may prepare the input for transmission to proxy 306, such as by expressing it in a human-readable form representing data structures and associative arrays, like JSON (JavaScript Object Notation) or a tag-delimited markup format, like XML (Extensible Markup Language).

Client 308 may send the input to proxy 306 asynchronously so that sending the input may be performed independently of displaying a video in the web page. In an asynchronous communication, client 308 may send proxy 306 the input independently of the video being displayed in the web page (e.g. while the video continues to be displayed in the web page). Then, if and when a response is received from the proxy 306 (e.g. proxy 306 sends client 308 more video corresponding to the result of processing the input), client 308 processes that response.

Proxy 306 receives the input from client 308, and, where that input is encoded in a format (such as JSON or XML), decode the input and re-encode the input as remote presentation session data. Proxy 306 may then send this encoded remote presentation session data to server 304, where server 304 injects the input into the appropriate application or user session for the remote presentation session, and performs processing associated with input being provided to that application or user session. When that processing results in further graphical output being generated that is associated with the remote presentation session, server 304 may encode this additional graphical output and send it to proxy 306, which converts it to video and sends it to client 308 for display.

In embodiments, server 304 and proxy 306 may be executed on virtual machines (VMs), both virtual machines executing on the same physical host computer. In such a scenario, the server 304 and proxy 306 may communicate via a loopback connection (one that uses an IP address that refers to the network interface that it uses itself—such as 127.0.0.1). Server 304 may listen on port 3389 and proxy 306 may listen on port 3390, for example. Then, server 304 may communicate with proxy 306 by transmitting data to 127.0.0.1:3390, and proxy 306 may communicate with server 304 by transmitting data to 127.0.0.1:3389. Using a loopback connection between the server 304 and proxy 306 executing on the same physical machine allows a legacy remote presentation server to operate without modification. This is similar to how using proxy 306 as an intermediary between server 304 and a client that uses a web browser to conduct a remote presentation session allows a legacy server to operate without modification. With regard to the loopback connection, a legacy remote presentation server that is configured only to transmit data to a client across a communications network interface may be used to effectuate embodiments of the invention, because the server will still communicate with a client (or the proxy) across a network communications interface.

Figure 4:
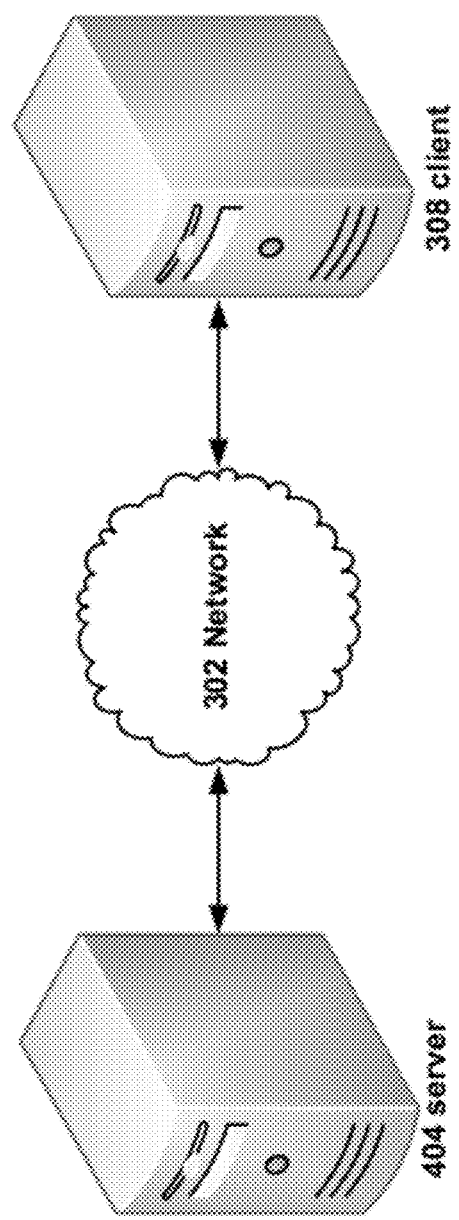
FIG. 4 depicts a client conducting a remote presentation session with a web browser, where a server generates video from graphical output created by an instance of an application or desktop that is being remoted.

FIG. 4 depicts a client conducting a remote presentation session with a web browser, where a server generates video from graphical output created by an instance of an application or desktop that is being remoted. Server 404 may be implemented in computer 20 of FIG. 1. One way that the computers depicted in FIG. 4 differ from those depicted in FIG. 3 is that server 404 differs from server 304. Server 304 is configured to conduct remote presentation sessions by exchanging with a client data encoded with a remote presentation protocol. Server 304 is not configured to send remote presentation data in the form of video to a client that conducts a remote presentation session using a web browser. Rather, proxy 306 is configured to receive remote presentation protocol-encoded data from a server and convert it to video, and receive user input from the client and encode that user input in the remote presentation protocol.

In contrast, server 404 of FIG. 4 is configured to send remote presentation data as video to client 308, which conducts the remote presentation session with a web browser. Client 306 may establish a HTTP connection with server 404 in a similar manner as client 306 establishes a HTTP connection with proxy 306 as described with respect to FIG. 3. Server 404 is then configured to take graphical output from applications or user sessions and encode the output into video without performing the intermediary step of encoding the output into remote presentation protocol-encoded data. For instance, where the graphical output from applications or user sessions comprises bitmap images, these bitmap images may be encoded as one or more frames of video by server 404.

Similar to how server 404 is able to conduct a remote presentation session by sending video to client 308 rather than remote presentation protocol-encoded data, server 404 may receive from client 308 user input directed to the web browser, encoded without a remote presentation protocol, such as with JSON or XML. Server 404 may decode this input and inject it into the associated application or user session, in a manner similar to how server 404 injects input encoded with a remote presentation protocol into an application or user session.

Figure 5:
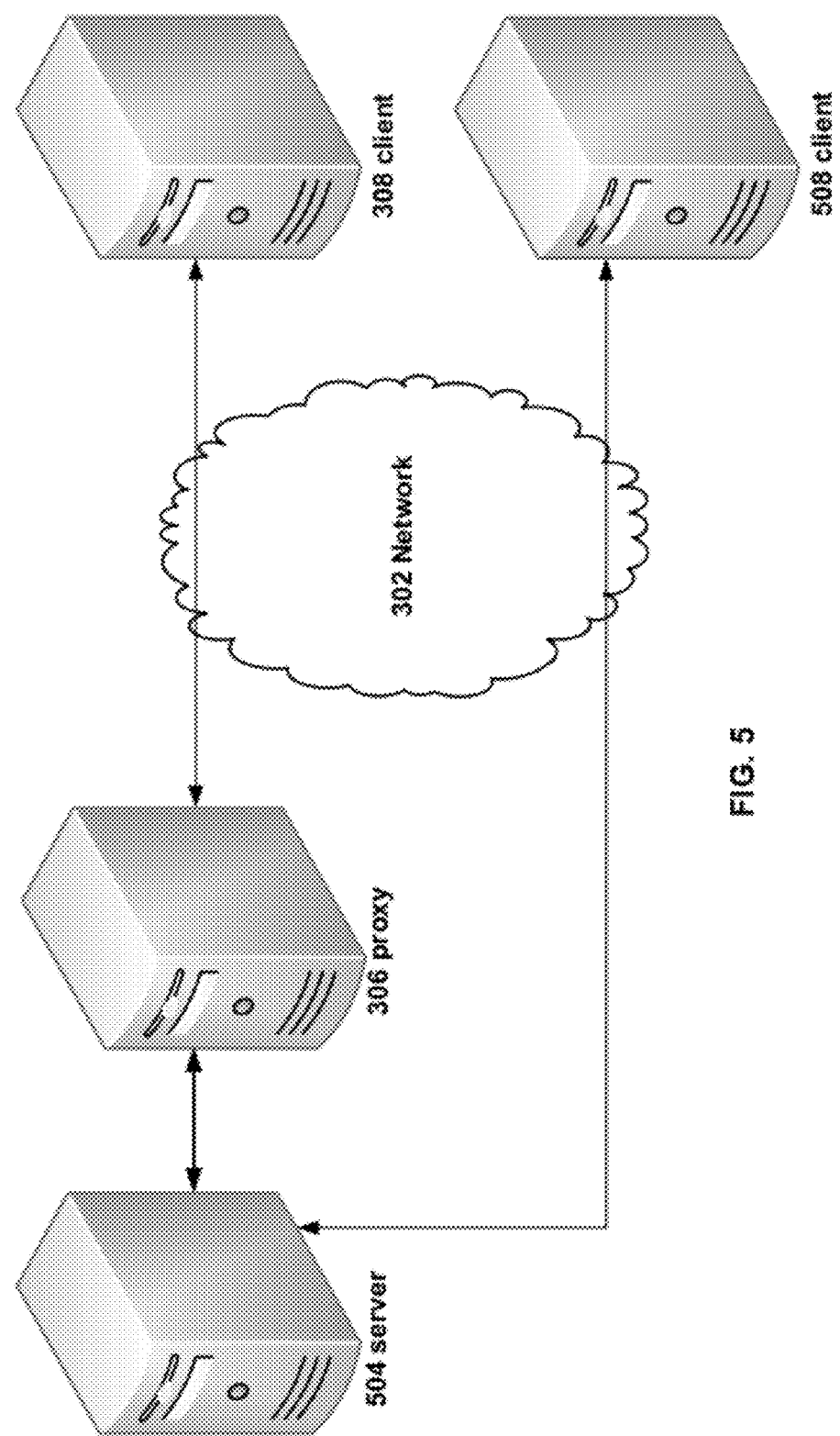
FIG. 5 depicts two clients conducting a remote presentation session with a server, one client using a web browser and communicating through a proxy and receiving graphics as video, and one client communicating directly with the server and receiving graphics encoded as remote presentation session data.

FIG. 5 depicts two clients conducting a remote presentation session with a server, one client using a web browser and communicating through a proxy and receiving graphics as video, and one client communicating directly with the server and receiving graphics encoded as remote presentation session data. Server 504 and client 508 may be implemented in computer 20 of FIG. 1. Server 504 may be configured conduct a remote presentation session with a client, such as client 508, using remote presentation protocol-encoded data. Server 504 may also be configured to conduct a remote presentation session with a client conducting the remote presentation session through a proxy, where the client uses a web browser, and the client and proxy communicate via a HTTP session, such as client 308. That is, server 504 may be configured to perform the functions of server 304 of FIG. 3 (which is configured to conduct a remote presentation session with a client using a web browser through proxy 306), and of server 404 of FIG. 4 (which is configured to conduct a remote presentation session directly with a client using a web browser).

Figure 6:
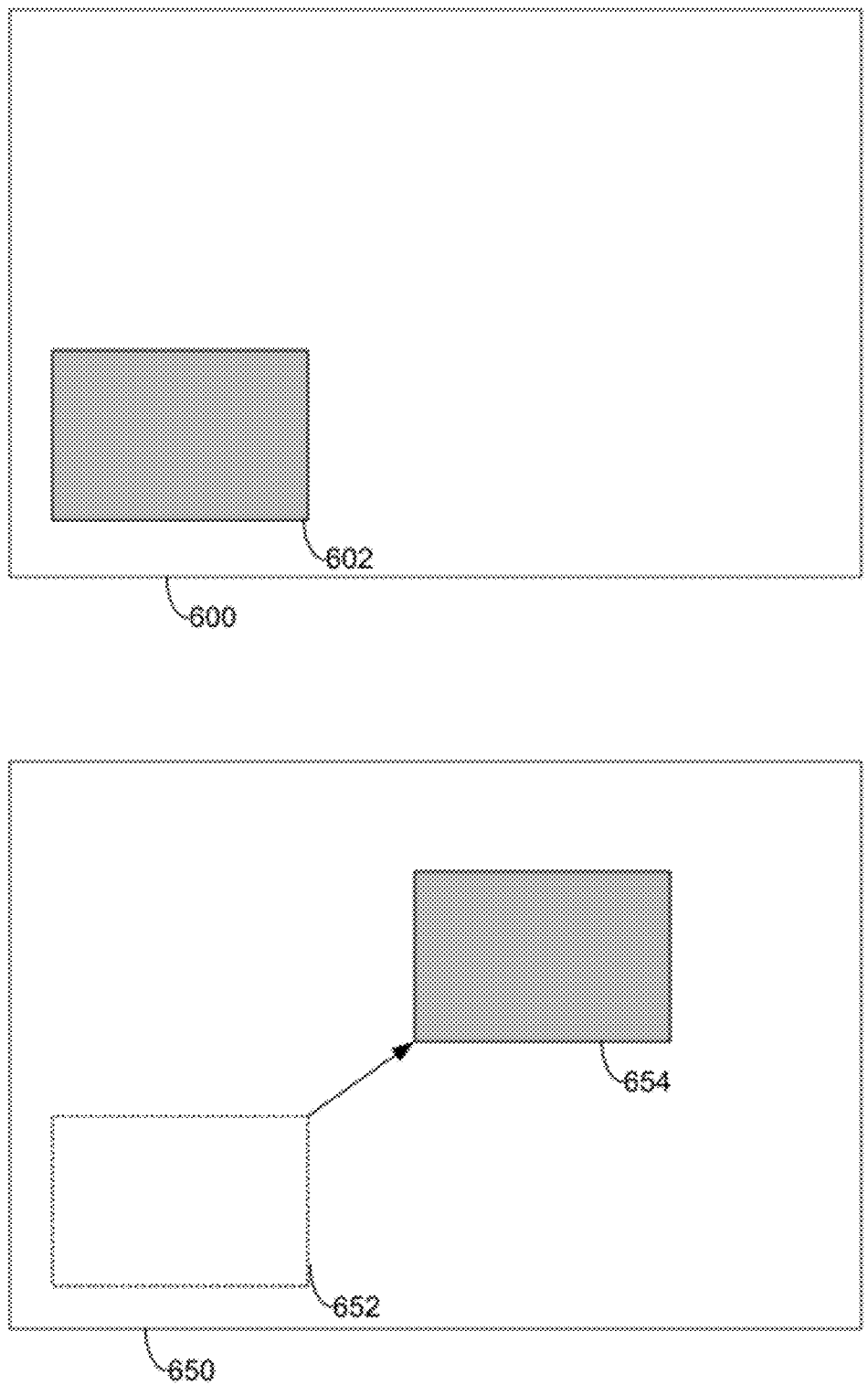
FIG. 6 depicts two frames of graphical data to be encoded as video, where a portion of each frame contains the same image, though in a different location, and where one frame may be encoded based on an encoding of the other frame.
Figure 7:
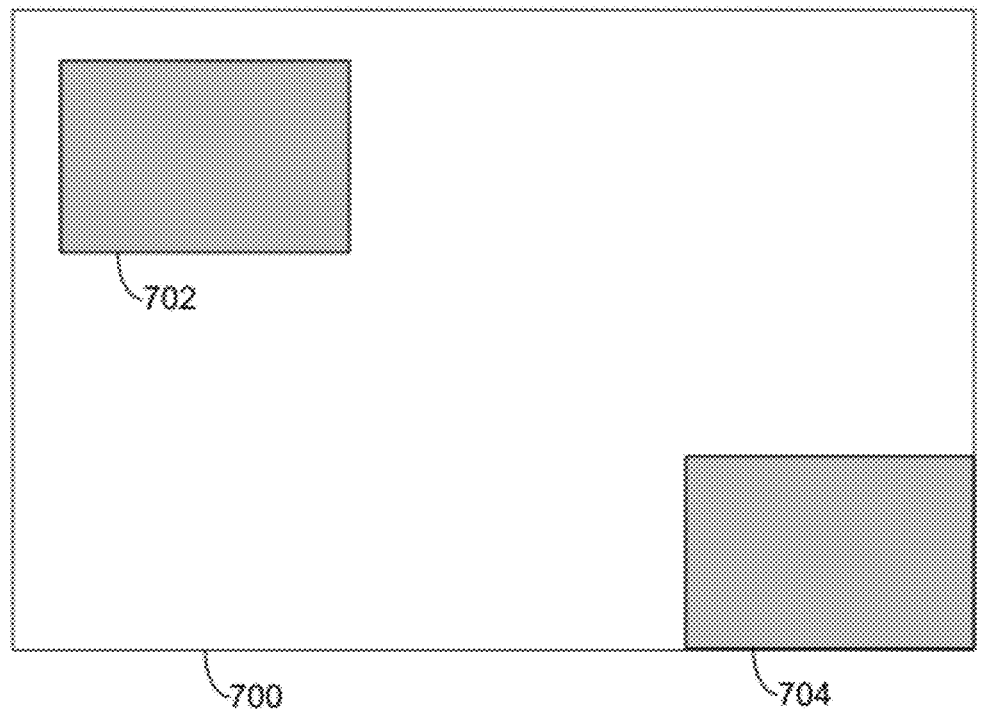
FIG. 7 depicts a frame of graphical data to be encoded as video, where the frame shares common features with a previous frame, and has "dirty" regions where the frames are different.

FIGS. 6-7 depict techniques for encoding graphics data as video to be transmitted in a remote presentation session. Where proxy 306 or server 404 is encoding the graphical output for multiple remote presentation sessions as video, the computers' processing capabilities may quickly become taxed or strained. In view of this, embodiments of the invention provide efficient ways to encode the graphical output of a remote presentation session as video. Some of these embodiments are depicted in FIGS. 6-7.

FIG. 6 depicts two frames of graphical data to be encoded as video, where a portion of each frame contains the same image, though in a different location, and where one frame may be encoded based on an encoding of the other frame. Frame 600 is a frame of graphical data from a computer desktop, and frame 650 is a frame of graphical data depicting that same desktop at a later time. Frame 600 comprises portion 602. In frame 650, that portion 602 of frame 600 has been moved from location 652 to location 654. Therefore, portions 602 and 654 depict the same image, just in a different location. Thus, the portion 654 of frame 650 may not need to be re-encoded. Rather, frame 650 excluding portion 654 may be encoded and then combined with the previously encoded portion 602 (placed in encoded frame in the location of portion 654) to produce an encoded frame 650. In using previously encoded data to encode frame 650, the computing resources necessary to encode frame 650 may be reduced, allowing a server or proxy that is encoding the frame to concurrently encode more frames (and thus, concurrently conduct more remote presentation sessions) than it would otherwise be able to concurrently encode.

FIG. 7 depicts a frame of graphical data to be encoded as video, where the frame shares common features with a previous frame, and has "dirty" regions where the frames are different. Frame 700 contains two dirty regions—dirty regions 702 and 704—where frame 700 differs from a frame that preceded it and which has been encoded. Frame 700 may be encoded as video by encoding dirty regions 702 and 704 and then combining these encoded dirty regions with the previously encoded non-dirty regions taken from the encoding of the previous frame. Like with respect to FIG. 6, in using previously encoded data to encode frame 700, the computing resources necessary to encode frame 700 may be reduced, allowing a server or proxy that is encoding the frame to concurrently encode more frames (and thus, concurrently conduct more remote presentation sessions) than it would otherwise be able to concurrently encode.

Figure 8:
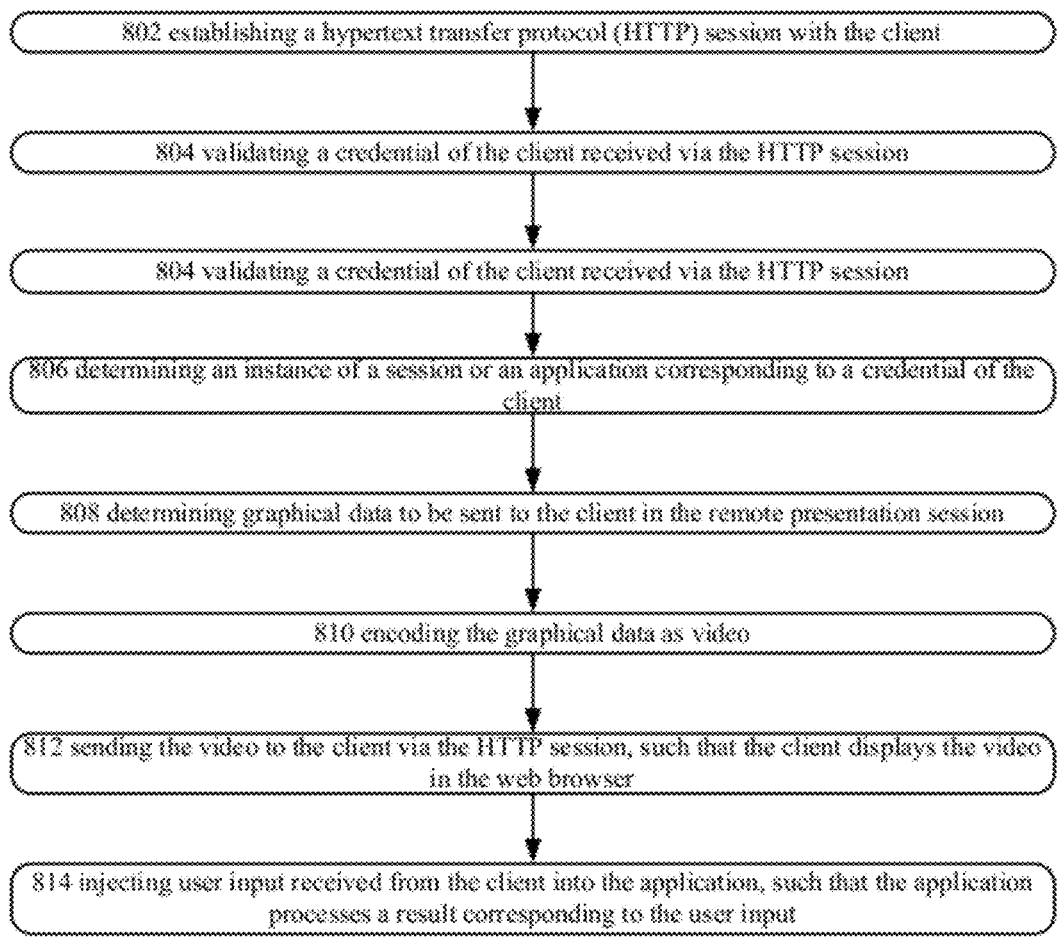
FIG. 8 depicts example operational procedures for a server that conducts a remote presentation session with a client that uses a web browser in the session.

FIG. 8 depicts example operational procedures for a server that conducts a remote presentation session with a client that uses a web browser in the session. In embodiments, the operational procedures of FIG. 8 may be effectuated by server 404 of FIG. 4, as it conducts a remote presentation session with client 308, where client 308 uses a web browser to conduct the session. It may be appreciated that, with respect to FIG. 8 (and FIGS. 9 and 10), there are embodiments of the invention that do not implement all of the depicted operations, or that implement the depicted operations in a different order than is described herein.

Operation 802 depicts establishing a hypertext transfer protocol (HTTP) session with the client. This may be effectuated, such as by the client sending the server a HTTP request for data via a HTTP session. This request for data may comprise a request for a web page containing a streaming video of a remoted desktop. The server may determine a HTTP session token that uniquely identifies the HTTP session and send it to the client. The client may store this token (such as in the form of an HTTP cookie) and then transmit it to the server in future communications to identify the HTTP session.

Operation 804 depicts validating a credential of the client received via the HTTP session. The client may use a credential to validate its authorization to conduct a remote presentation session with the server. In embodiments, this credential comprises a user login and password, where the user login is associated with a user's account on the server. The server may store a database of credentials and check the proffered credential against the database for a match, which may indicate that the credential is validated.

Operation 806 depicts determining an instance of a session or an application corresponding to a credential of the client, the graphical data comprising graphical output of the instance. In embodiments, the server will instantiate an instance of a user session and begin executing it. Where there is a disconnected user session corresponding to the credential, the server may reconnect that session. In embodiments, such as where the credential corresponds to multiple possible applications, the server may send the client an indication of the possible applications and/or sessions to be remoted, and determine which one to remote the graphical output of based on a received indication of a selection of one of the possible applications and/or sessions.

Operation 808 depicts determining graphical data to be sent to the client in the remote presentation session. As the server executes the instance of the user session or application determined in operation 806, that execution will result in graphical data being generated. This is graphical data that will be sent (or a representation thereof will be sent) via the remote presentation session. Determining graphical data to be sent to the client may be performed in a similar manner as described with respect to server 204 of FIG. 2.

Operation 810 depicts encoding the graphical data as video. In embodiments, operation 810 includes encoding the graphical data as video based on having previously encoded a second graphical data as second video. That is, the current video being encoded may have commonalities with previously encoded video, and the server may exploit these commonalities to reduce the processing resources used to encode the graphical data as video. For instance, this may comprise encoding the graphical data based on a dirty region of the graphical data relative to the second graphical data, and using at least part of the second video to encode the graphical data. This may occur, for instance, as depicted with respect to frame 700 of FIG. 7. Where there are a few updates between the graphical data and the second graphical data, these updates may be expressed as "dirty regions" that identify the areas of the respective graphical datas that differ. Then, the server may encode only the dirty regions of the graphical data as video, and combined these encoded dirty regions with the second video that contains video of the non-dirty regions to create video of the graphical data.

Embodiments of encoding the graphical data as video based on having previously encoded a second graphical data as second video also include encoding the graphical data based on an element depicted in the graphical data also being depicted in the second graphical data, the element being depicted in a different location in the graphical data than in the second graphical data, and using at least part of the second video to encode the graphical data. That is, the an application window (or the like) may have been moved between the graphical data and the second graphical data. This may occur, for instance, as depicted with respect to frames 600 and 650 of FIG. 6. Where this move is identified, the server may take the portion of the second video corresponding to the application window and use it to create the video. It may encode as video those portions of the graphical data that are not that application window, and combine that with the encoded video of the application window from the second window.

In embodiments, operation 810 includes receiving an indication that a first part of the graphical data comprises text and a second part of the graphical data comprises an image or video; and encoding the graphical data as video based on the indication that the first part of the graphical data comprises text and the second part of the graphical data comprises the image or video. Some remote presentation servers are configured to receive "hints" from the applications whose graphical output they are remoting, where these hints indicate what the graphical output is—e.g. text, solid fills, images, or videos. Some remote presentation servers are configured to analyze graphical data to determine this information. In such embodiments, the video may be encoded based on this information. For example, users may be more sensitive to seeing compression artifacts in text than in images. The server may variably encode the graphical output to video, such that it uses a more lossy compression on the portions of the graphical output that are images than on the portions of the graphical output that are text.

Operation 812 depicts sending the video to the client via the HTTP session, such that the client displays the video in the web browser. In embodiments, operation 812 comprises sending the video to the client via the HTTP session, such that the client displays the video as a video element embedded in a web page displayed in the web browser. For instance, the video may be embedded in a HTML5 web page, being referenced via a <video> tag in the web page. In embodiments, the video is a streaming video, so that, as the server continues to generate graphical data from one or more applications or user sessions, that graphical data is encoded and sent to the client as additional video in the streaming video.

Operation 814 depicts receiving from the client user input directed to the web browser; determining an application corresponding to the user input, the application having produced at least part of the graphical data; and injecting the user input into the application, such that the application processes a result corresponding to the user input. As the client displays the video in the web browser, the user may provide input to the web browser, such as by moving a mouse cursor, or typing at a keyboard. This information may be captured by the client and sent to the server via the HTTP session. When the server receives the input, it may then determine the application that the user referenced with the input (e.g. input at the upper left corner of the video, where a particular application window is depicted in that spot may be determined to be input directed to that application window). Then the server may inject the input into the determined application, such as described with respect to FIG. 2.

Figure 9:
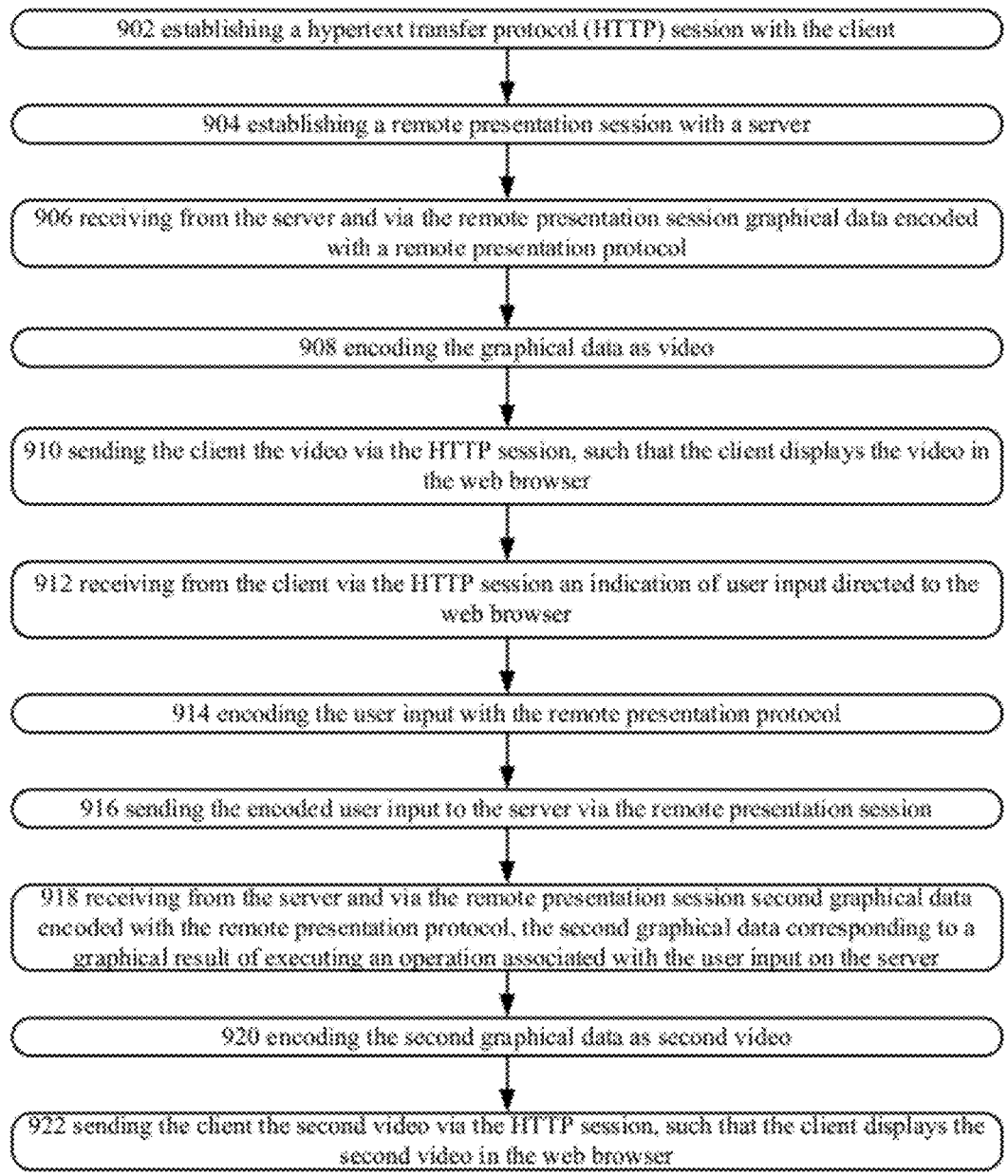
FIG. 9 depicts example operational procedures for a proxy server that facilitates a remote presentation session between a remote presentation session server and a client that uses a web browser in the session.

FIG. 9 depicts example operational procedures for a proxy server that facilitates a remote presentation session between a remote presentation session server and a client that uses a web browser in the session. The operational procedures of FIG. 9 may be implemented in proxy 306 of FIG. 6, as it facilitates a remote presentation session between server 304 and client 308.

Operation 902 depicts establishing a hypertext transfer protocol (HTTP) session with the client. Operation 902 may be effectuated in a manner similar to how operation 802 of FIG. 8 is effectuated.

Operation 904 depicts establishing a remote presentation session with a server. Operation 904 may be effectuated in a similar manner as server 204 processes a connection request over a network connection from a client 201, as depicted in FIG. 2. In operation 904, to establish the remote presentation session, proxy server 306 takes the role of client 201, and server 304 takes the role of server 204. In embodiments, client 201 sends a credential to proxy 306 that may be used to validate the client's authorization to conduct a remote presentation session with server 204. Proxy 306 may validate the credential itself, and/or pass the credential to server 204. Server 204 may use the credential as part of establishing the remote presentation session to validate that the computer that provided credential as part of establishing the remote presentation session, and/or determining an instance of a session or an application corresponding to a credential of the client, the graphical output of which is to be sent in the remote presentation session, as is depicted in operation 806.

Operation 906 depicts receiving from the server and via the remote presentation session graphical data encoded with a remote presentation protocol. Once the remote presentation session has been established, server 204 sends proxy 306 graphics data (such as that generated by an application or user session executing on server 204) that is encoded with the remote presentation session protocol.

Operation 908 depicts encoding the graphical data as video. In embodiments, operation 908 comprises decoding the graphical data from its remote presentation protocol encoding to generate one or more images, and then re-encoding the one or more images as a video. In embodiments, operation 908 comprises converting the graphical data from its remote-presentation-protocol encoding to a video encoding without performing an intermediary step of decoding the graphical data to produce an image.

Operation 910 depicts sending the client the video via the HTTP session, such that the client displays the video in the web browser. In embodiments, the client's web browser may be configured to receive and display information that adheres to the HTML5 (Hypertext Markup Language 5) standard. In such embodiments, the video may be embodied within a web page, such as by using the HTML5<video>tag. For instance, where the graphical data is encoded as a video titled "remote_presentation_session.avi" that is located on the proxy in the same directory as the web page in which it is being embedded, the <video> tag may be represented in the web page as "<video src="remote_presentation_session.avi"autoplay="autoplay"/>." In this example, the attribute of autoplay="autoplay" signifies that the web browser will begin automatically playing the video upon receiving an initial portion of it.

Operation 912 depicts receiving from the client via the HTTP session an indication of user input directed to the web browser. The client may display the video in the web browser, as described with respect to operation 910 and the client may provide input to the web browser, such as cursor movements, and button pushes, including pushes of keyboard buttons. These may be captured on the client and transmitted to the proxy via the HTTP session. In embodiments, a location of where the input was provided is also transmitted to the proxy via the HTTP session.

Operation 914 depicts encoding the user input with the remote presentation protocol. The proxy may take the user input that it received from the client in operation 912 and encode it according to the remote presentation protocol. For instance, user input may be received as formatted in the JSON (JavaScript Object Notation) standard, which structures the input according to a schema-like object—an object that has constraints on the structure and content of objects of that type. In such a case, the proxy may extract the user input from the JSON format, and encode it with the remote presentation protocol.

Operation 916 depicts sending the encoded user input to the server via the remote presentation session. This may comprise the proxy sending the user input that is encoded with the remote presentation protocol to the server via the remote presentation session connection.

Operation 918 depicts receiving from the server and via the remote presentation session second graphical data encoded with the remote presentation protocol, the second graphical data corresponding to a graphical result of executing an operation associated with the user input on the server. This may be effectuated similar to how operation 906 is effectuated. Here, the server has received the user input, performed processing associated with the user input, and generated more remote presentation session graphical data associated with a graphical result (as well as possibly an audio result, or perhaps only an audio result) from performing processing associated with the user input. Having generated the graphical result, the server has encoded it with the remote presentation protocol, and transmitted it to the proxy.

Operation 920 depicts encoding the second graphical data as second video. Operation 920 may be performed in a similar manner as operation 908. The second video and the same video may be part of the same streaming video, with the second video comprising one or more frames that follow the first video in the video stream.

Operation 922 depicts sending the client the second video via the HTTP session, such that the client displays the second video in the web browser. Operation 922 may be performed in a manner similar to operation 910.

Figure 10:
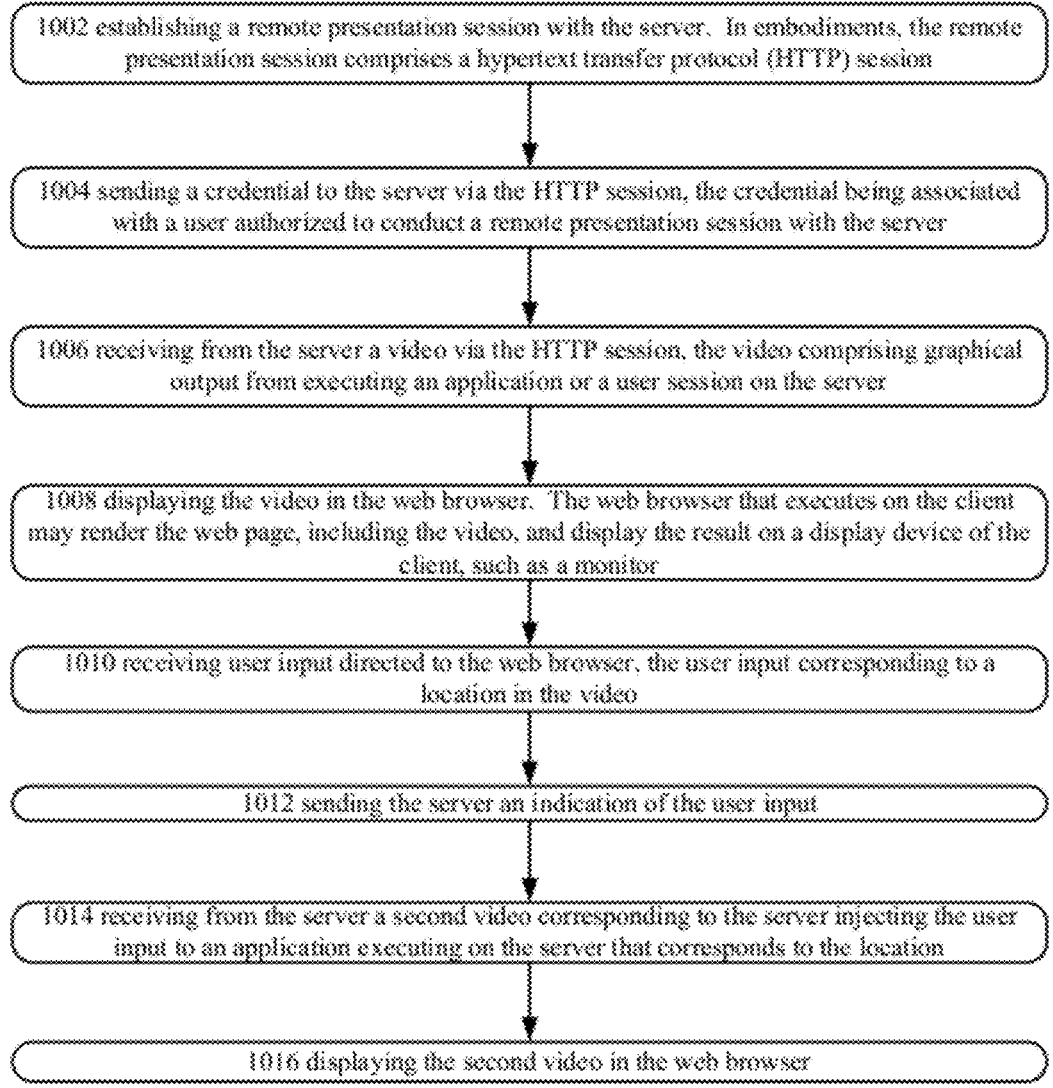
FIG. 10 depicts example operational procedures for a client that uses a web browser to conduct a remote presentation session with a server.

FIG. 10 depicts example operational procedures for a client that uses a web browser to conduct a remote presentation session with a server. For example, these operational procedures may be effectuated as it communicates with proxy 306 of FIG. 3 or server 404 of FIG. 4.

Operation 1002 depicts establishing a remote presentation session with the server. In embodiments, the remote presentation session comprises a hypertext transfer protocol (HTTP) session. Operation 1002 may be effectuated similar to the description of how operation 802 is effectuated with respect to the client.

Operation 1004 depicts sending a credential to the server via the HTTP session, the credential being associated with a user authorized to conduct a remote presentation session with the server. Operation 1004 may be effectuated similar to the description of how operation 804 is effectuated with respect to the client. In embodiments, the client may prompt a user to enter input of a login and password, and use the received input as the credential.

Operation 1006 depicts receiving from the server a video via the HTTP session, the video comprising graphical output from executing an application or a user session on the server. This may comprise receiving from the server a web page (such as a HTML5 web page) that contains a <video> element, where the <video> element references the video comprising graphical output from executing an application or a user session on the server.

Operation 1008 depicts displaying the video in the web browser. The web browser that executes on the client may render the web page, including the video, and display the result on a display device of the client, such as a monitor.

Operation 1010 depicts receiving user input directed to the web browser, the user input corresponding to a location in the video. The web page that contains the video may also contain logic, such as that expressed in JavaScript, that is configured to detect and capture user input directed to the web page. This user input may comprise, for instance, cursor movements and/or keyboard key presses.

Operation 1012 depicts sending the server an indication of the user input. In embodiments, the user input is sent along with an indication of where the input was made relative to the video (e.g. the cursor entered the left edge of the video 50 pixels from the top left corner, and was moved 75 pixels to the right in time t). In embodiments, the input may be formatted for transport, such as formatted in a human-readable form representing data structures and associative arrays, like JSON (JavaScript Object Notation) or a tag-delimited markup format, like XML (Extensible Markup Language).

Operation 1014 depicts receiving from the server a second video corresponding to the server injecting the user input to an application executing on the server that corresponds to the location. This second video and the video may both be part of one streaming video—a streaming video depicting the graphical output from the server that is remoted as it changes over time.

Operation 1016 depicts displaying the second video in the web browser. As the client continues to receive the streaming video, including the second video, it may display the streaming video in the web browser.

Figure 11:
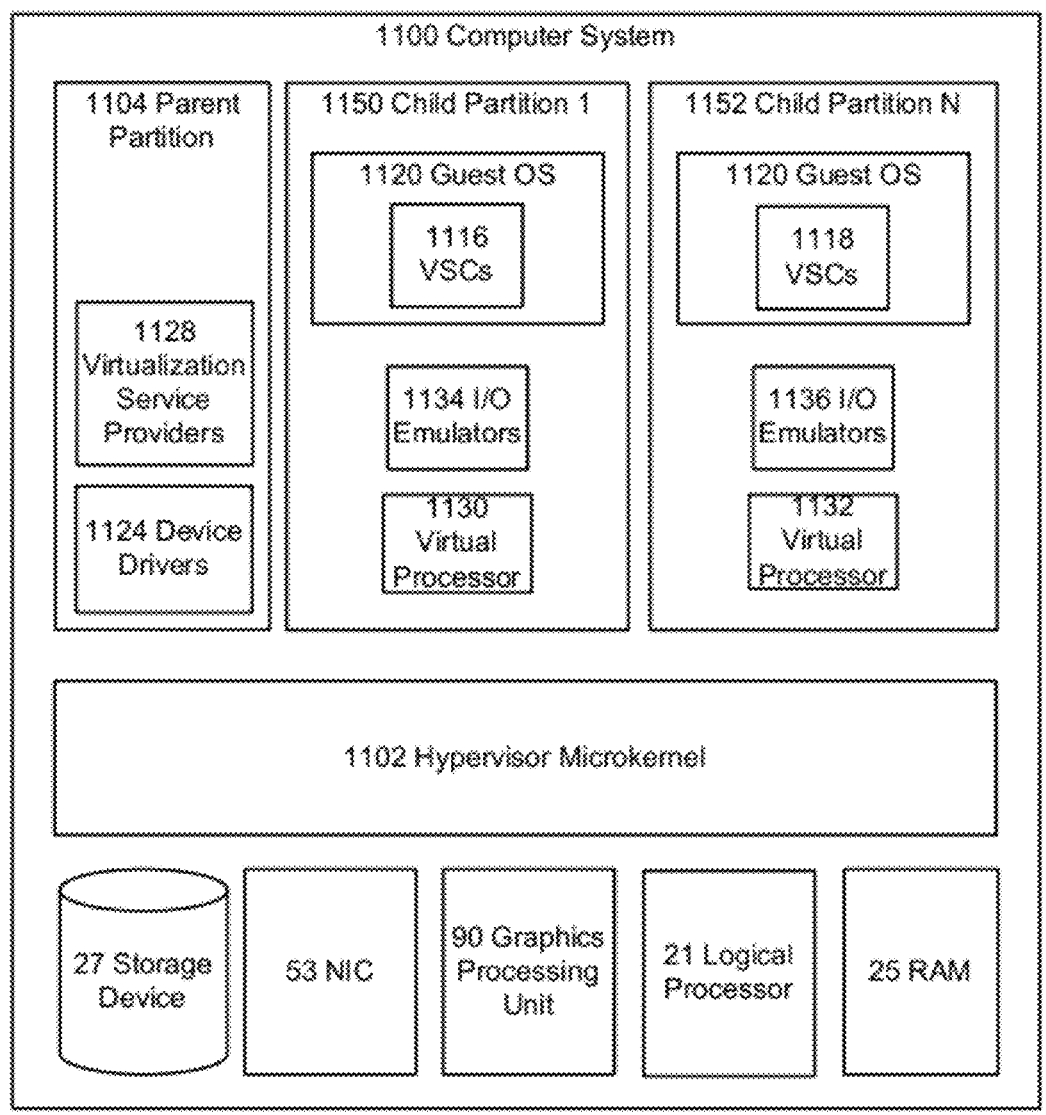
FIG. 11 depicts an example virtual machine server that may be host one or more virtual machines that conduct a remote presentation session with a client, the client using a web browser and receiving remote presentation graphics as video.
Figure 12:
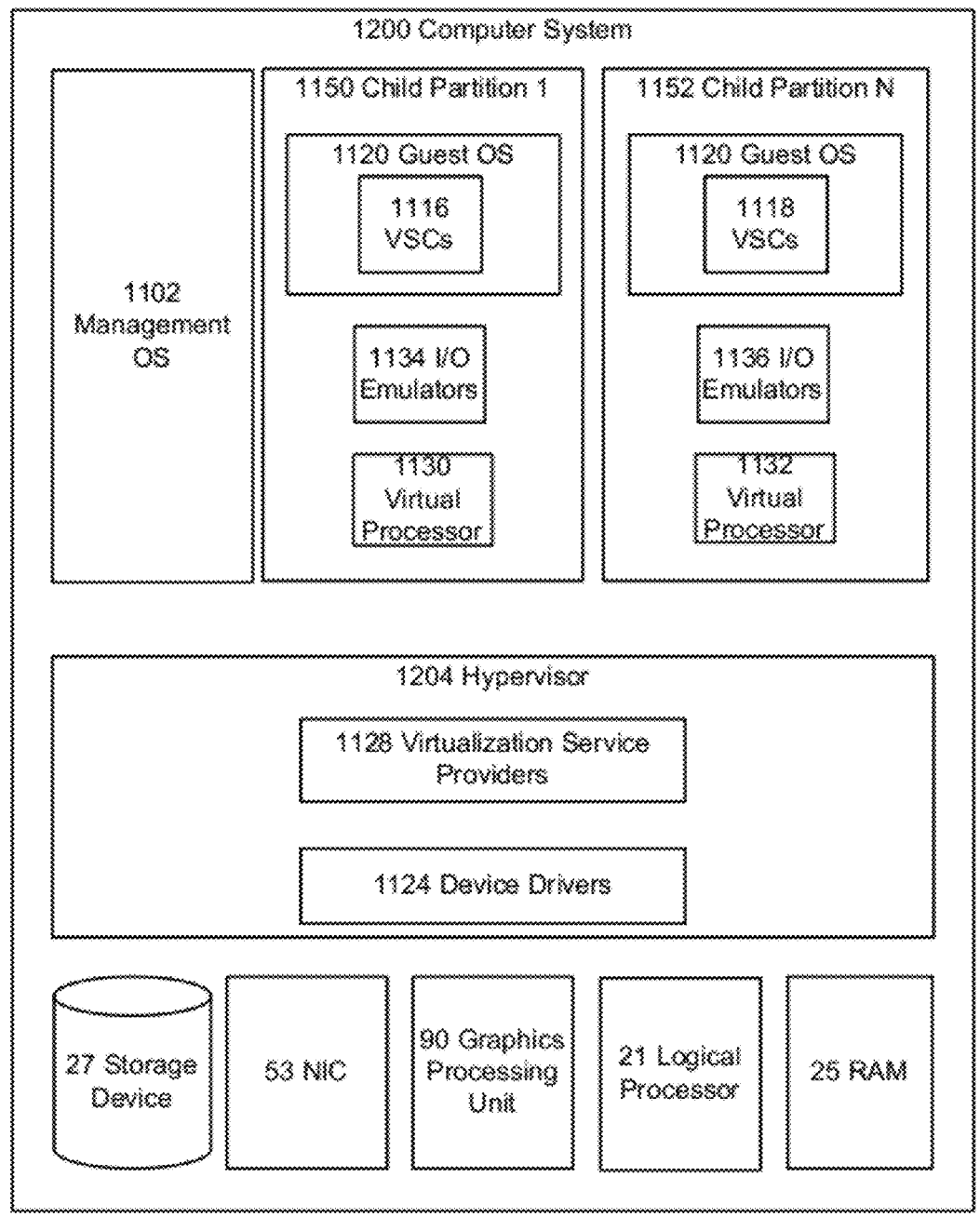
FIG. 12 depicts another example virtual machine server that may be host one or more virtual machines that conduct a remote presentation session with a client, the client using a web browser and receiving remote presentation graphics as video.

FIGS. 11 and 12, depict high level block diagrams of computer systems 1100 and 1200 configured to effectuate virtual machines. In example embodiments of the invention, computer systems 1100 and 1200 can include elements described in FIG. 1. As shown by the figures, different architectures can exist; however, they generally have similar components. For example, FIG. 11 illustrates an operational environment where a hypervisor, which may also be referred to in the art as a virtual machine monitor, is split into a microkernel 1102 and a parent partition 1104 whereas FIG. 12 illustrates hypervisor 1204 as including elements found in the parent partition 1104 of FIG. 11.

FIG. 11 depicts an example virtual machine server that may be host one or more virtual machines that conduct a remote presentation session with a client, the client using a web browser and receiving remote presentation graphics as video. Hypervisor microkernel 1102 can be configured to control and arbitrate access to the hardware of computer system 1100. Broadly, hypervisor microkernel 1102 can generate execution environments called partitions such as child partition 11150 through child partition N 1152 (where N is an integer greater than 1). In embodiments a child partition is the basic unit of isolation supported by hypervisor microkernel 1102. That is, each child partition can be mapped to a set of hardware resources, e.g., memory, devices, logical processor cycles, etc., that is under control of the hypervisor microkernel 1102 and hypervisor microkernel 1102 can isolate processes in one partition from accessing another partition's resources, e.g., a guest operating system in one partition may be isolated from the memory of another partition and thus may not be able to detect memory addresses outside of it's partition. In embodiments hypervisor microkernel 1102 can be a stand-alone software product, a part of an operating system, embedded within firmware of the motherboard, specialized integrated circuits, or a combination thereof.

Parent partition 1104 in this operational environment can be configured to provide resources to guest operating systems executing in the child partitions 1-N by using virtualization service providers 1128 (VSPs) that are typically referred to as back-end drivers in the open source community. Broadly, VSPs 1128 can be used to multiplex the interfaces to the hardware resources by way of virtualization service clients (VSCs) (typically referred to as front-end drivers in the open source community) and communicate with the virtualization service clients via communication protocols. As shown by the figures, virtualization service clients can execute within the context of guest operating systems. These drivers are different than the rest of the drivers in the guest in that they may be supplied with a hypervisor, not with a guest.

Microkernel 1102 can enforce partitioning by restricting a guest operating system's view of system memory. Guest memory is a partition's view of memory that is controlled by a hypervisor. The guest physical address can be backed by system physical address (SPA), i.e., the memory of the physical computer system, managed by hypervisor. As shown by the figure, in an embodiment the GPAs and SPAs can be arranged into memory blocks, i.e., one or more pages of memory. When a guest writes to a block using its page table the data is actually stored in a block with a different system address according to the system wide page table used by hypervisor.

As shown by the figure, in embodiments of the present disclosure IO emulators (1134 and 1136), e.g., virtualized IDE devices, virtualized video adaptors, virtualized NICs, etc., can be configured to run within their respective child partitions. Described in more detail below, by configuring the emulators to run within the child partitions the attack surface of the hypervisor is reduced as well as the computational overhead.

Each child partition can include one or more virtual processors (1130 and 1132) that guest operating systems (1120 and 1122) can manage and schedule threads to execute thereon. Generally, the virtual processors are executable instructions and associated state information that provide a representation of a physical processor with a specific architecture. For example, one virtual machine may have a virtual processor having characteristics of an INTEL x86 processor, whereas another virtual processor may have the characteristics of a PowerPC processor. The virtual processors in this example can be mapped to logical processors of the computer system such that the instructions that effectuate the virtual processors will be backed by logical processors. Thus, in an embodiment including multiple logical processors, virtual processors can be simultaneously executed by logical processors while, for example, other logical processor execute hypervisor instructions. The combination of virtual processors and memory in a partition can be considered a virtual machine.

Guest operating systems can include any operating system such as, for example, different versions of the MICROSOFT WINDOWS operating system (e.g. WINDOWS XP and WINDOWS 7). The guest operating systems can include user/kernel modes of operation and can have kernels that can include schedulers, memory managers, etc. Generally speaking, kernel mode can include an execution mode in a logical processor that grants access to at least privileged processor instructions. Each guest operating system can have associated file systems that can have applications stored thereon such as terminal servers, e-commerce servers, email servers, etc., and the guest operating systems themselves. The guest operating systems can schedule threads to execute on the virtual processors and instances of such applications can be effectuated.

FIG. 12 depicts another example virtual machine server that may be host one or more virtual machines that conduct a remote presentation session with a client, the client using a web browser and receiving remote presentation graphics as video. FIG. 12 depicts an alternative architecture to that described above in FIG. 11. FIG. 12 depicts similar components to those of FIG. 11; however in this example embodiment the hypervisor 1204 can include the microkernel component and components from the parent partition 1104 of FIG. 11 such as the virtualization service providers 1128 and device drivers 1124 while management operating system 1202 may contain, for example, configuration utilities used to configure hypervisor 1204. In this architecture hypervisor 1204 can perform the same or similar functions as hypervisor microkernel 1102 of FIG. 11; however, in this architecture hypervisor 1204 can be configured to provide resources to guest operating systems executing in the child partitions. Hypervisor 1204 of FIG. 12 can be a stand alone software product, a part of an operating system, embedded within firmware of the motherboard or a portion of hypervisor 1204 can be effectuated by specialized integrated circuits.

Figure 13:
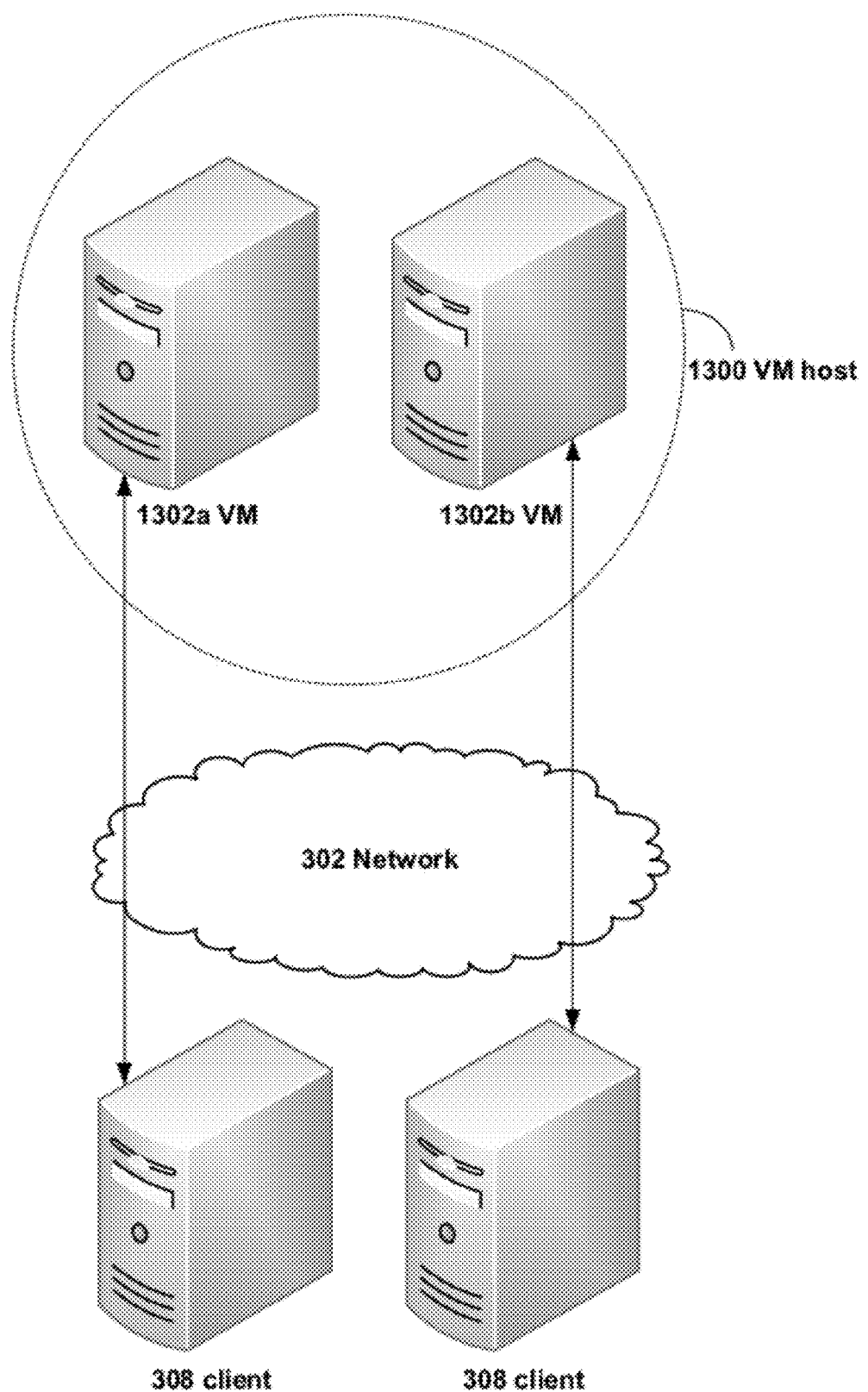
FIG. 13 depicts an example system comprising a virtual machine server that hosts a plurality of virtual machines, each virtual machine conducting a remote presentation session with a client, the client using a web browser and receiving remote presentation graphics as video.

FIG. 13 depicts an example system comprising a virtual machine server that hosts a plurality of virtual machines, each virtual machine conducting a remote presentation session with a client, the client using a web browser and receiving remote presentation graphics as video. In embodiments, VM host 1300 may be embodied in computer system 1100 of FIG. 11 or computer system 1200 FIG. 12. In such embodiments, VM 1302*a* and VM 1302*b* may be embodied in child partitions 1150 or 1152 of FIGS. 11 and 12.

As depicted, VM 1302*a* and 1302*b* are each configured to serve remote presentation sessions with one or more clients that receive video via the remote presentation session, and conduct the remote presentation session via a web browser. For instance, each of VM 1302*a* and 1302*b* may be configured to effectuate the functions of server 304 of FIG. 3. In such embodiments, a client 308 may connect to VM host 1300, and VM host may direct one of its VMs to serve the remote presentation session with that client. VM host 1300 may make this direction, for example, based on balancing the load of each VM that it hosts.

While the present invention has been described in connection with the preferred aspects, as illustrated in the various figures, it is understood that other similar aspects may be used or modifications and additions may be made to the described aspects for performing the same function of the present disclosure without deviating there from. Therefore, the present disclosure should not be limited to any single aspect, but rather construed in breadth and scope in accordance with the appended claims. For example, the various procedures described herein may be implemented with hardware or software, or a combination of both. The invention may be implemented with computer-readable storage media and/or computer-readable communication media. Thus, the invention, or certain aspects or portions thereof, may take the form of program code (i.e., instructions) embodied in tangible media, such as floppy diskettes, CD-ROMs, hard drives, or any other machine-readable storage medium. Likewise, the invention, or certain aspects or portions thereof, may be embodied in propagated signals, or any other machine-readable communications medium. Where the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed:

1. A method for conducting a remote presentation session with a client that uses a web browser, comprising:
   establishing a hypertext transfer protocol (HTTP) session with the client;
   establishing a remote presentation session with a remote presentation session process of a server;
   receiving, from the remote presentation session process, graphical data encoded with a remote presentation protocol;
   decoding the graphical data encoded with the remote presentation protocol;
   encoding the decoded graphical data as video; and
   sending HTTP encoded data including the video to the client via the HTTP session to cause the client to display the video in the web browser, wherein the HTTP encoded data sent to the client is not encoded with the remote presentation protocol.

2. The method of claim 1, wherein encoding the decoded graphical data as video comprises:
   encoding the decoded graphical data as video based on having previously encoded a second graphical data as second video.

3. The method of claim 2, wherein encoding the decoded graphical data as video based on having previously encoded a second graphical data as video comprises:
   encoding the decoded graphical data based on a dirty region of the decoded graphical data relative to the second graphical data, and using at least part of the second video to encode the decoded graphical data.

4. The method of claim 2, wherein encoding the decoded graphical data as video based on having previously encoded a second graphical data as video comprises:
   encoding the decoded graphical data based on an element depicted in the graphical data also being depicted in the second graphical data, the element being depicted in a different location in the decoded graphical data than in the second graphical data, and using at least part of the second video to encode the decoded graphical data.

5. The method of claim 1, wherein sending the video to the client via the HTTP session, such that the client displays the video in the web browser comprises:
   sending the video to the client via the HTTP session to cause the client to display the video as a video element embedded in a web page displayed in the web browser.

6. The method of claim 1, further comprising:
   before establishing the remote presentation session, validating a credential of the client received via the HTTP session.

7. The method of claim 1, further comprising:
   receiving an indication that a first part of the graphical data comprises text and a second part of the graphical data comprises an image or video; and
   wherein encoding the decoded graphical data as video comprises:
   encoding the decoded graphical data as video based on the indication that the first part of the decoded graphical data comprises text and the second part of the decoded graphical data comprises the image or video.

8. The method of claim 1, wherein establishing a remote presentation session with a remote presentation session process of a server comprises:
   determining the remote presentation session based on the remote presentation session corresponding to a credential of the client.

9. The method of claim 1, wherein encoding the decoded graphical data as video comprises:
   determining a video format that the client is configured to decode and display; and
   encoding the decoded graphical data as video in the video format.

10. The method of claim 1, further comprising:
    receiving from the client user input directed to the web browser via the HTTP session;
    encoding the user input directed to the web browser with the remote presentation protocol; and
    sending the encoded user input to the remote presentation session process.

11. A system comprising:
    a processor; and
    a memory configured to cause the system at least to:
    establish a remote presentation session comprising a hypertext transfer protocol (HTTP) session with a first computer;
    establish a remote presentation session with a remote presentation session process;

receive, from the remote presentation session process, graphical data encoded with a remote presentation protocol;

decode the graphical data encoded with the remote presentation protocol;

encode the decoded graphical data as video; and send HTTP encoded data including the video to the first computer via the HTTP session to cause the first computer to display the video in a web browser, wherein the HTTP encoded data sent to the client is not encoded with the remote presentation protocol.

12. The system of claim 11, wherein the processor and memory are further configured to cause the system at least to:

before receiving graphical data from the remote presentation session process, sending a credential to the remote presentation session process, the credential being associated with a user authorized to conduct a remote presentation session with the remote presentation session process.

13. The system of claim 11, wherein the processor and memory are further configured to cause the system at least to:

receive an indication of user input from the first computer asynchronously from the first computer displaying the video in the web browser.

14. The system of claim 11, wherein the processor and memory are further configured to cause the system at least to:

receive second video from the remote presentation session process, the second video having been encoded by the system based on the video.

15. The system of claim 14, wherein the processor and memory are further configured to cause the system at least to:

receive second video from the remote presentation session process, the second video having been encoded by the remote presentation session process based on a dirty region of the second video relative to the video.

16. The system of claim 14, wherein the processor and memory are further configured to cause the system at least to:

receive second video from the remote presentation session process, the second video having been encoded by the remote presentation session process based on an element being depicted in the video and the second video, the element being depicted in a different location in the video than in the second video.

17. The system of claim 11, wherein the processor and memory are further configured to cause the system at least to:

receive from the first computer user input directed to the web browser via the HTTP session;

encode the user input directed to the web browser with the remote presentation protocol; and send the encoded user input to the remote presentation session process.

18. A computer-readable storage device for facilitating a remote presentation session between a server and a client that uses a web browser, bearing computer-readable instructions that, when executed upon a computer, cause the computer to perform operations comprising:

receiving, by the computer, from the server a graphical data encoded with a remote presentation protocol;

decoding, by the computer, the graphical data encoded with the remote presentation protocol, and encoding the decoded graphical data as a video; and sending, by the computer, HTTP encoded data including the video to the client via an HTTP session over an HTTP connection between the client and the computer to cause the client to display the video in the web browser, wherein the HTTP encoded data sent to the client is not encoded with the remote presentation protocol.

19. The computer-readable storage device of claim 18, further bearing computer-readable instructions that, when executed upon the computer, cause the computer to perform operations comprising:

receiving from the client user input directed to the web browser via the HTTP session;

encoding the user input directed to the web browser with the remote presentation protocol; and sending the encoded user input to the server.

* * * * *